United States Patent
Valfridsson et al.

(10) Patent No.: US 9,460,869 B2
(45) Date of Patent: Oct. 4, 2016

(54) ELECTRIC HAND TOOL WITH ACTIVATION INDICATION DEVICE

(75) Inventors: Stefan Valfridsson, Jönköping (SE);
Carl-Johan Fong, Gränna (SE); Ulrik Gejervall, Forserum (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 13/514,751

(22) PCT Filed: Dec. 16, 2009

(86) PCT No.: PCT/SE2009/051430
§ 371 (c)(1),
(2), (4) Date: Jun. 8, 2012

(87) PCT Pub. No.: WO2011/075018
PCT Pub. Date: Jun. 23, 2011

(65) Prior Publication Data
US 2012/0249313 A1    Oct. 4, 2012

(51) Int. Cl.
| | | |
|---|---|---|
| H04B 3/36 | (2006.01) | |
| H01H 9/06 | (2006.01) | |
| A01G 3/053 | (2006.01) | |
| H01H 3/00 | (2006.01) | |

(52) U.S. Cl.
CPC ............... H01H 9/06 (2013.01); A01G 3/053 (2013.01); *H01H 2003/008* (2013.01)

(58) Field of Classification Search
None
See application file for complete search history.

(56) References Cited

U.S. PATENT DOCUMENTS

| | | | | |
|---|---|---|---|---|
| 3,846,777 A | * | 11/1974 | Brown | .......................... 340/654 |
| 4,958,541 A | * | 9/1990 | Annis | ................ B25B 23/1425 |
| | | | | 81/479 |
| 5,619,181 A | * | 4/1997 | Murray | .................... G08B 6/00 |
| | | | | 310/81 |
| 5,632,569 A | * | 5/1997 | Szmansky | ............. E04F 21/163 |
| | | | | 15/235.4 |
| 7,551,411 B2 | | 6/2009 | Woods et al. | |

(Continued)

FOREIGN PATENT DOCUMENTS

| | | |
|---|---|---|
| CN | 2670066 Y | 1/2005 |
| CN | 1629755 A | 6/2005 |

(Continued)

OTHER PUBLICATIONS

International Search Report and Written Opinion of PCT/SE2009/051430 mailed on Aug. 26, 2010.

(Continued)

*Primary Examiner* — Curtis King
(74) *Attorney, Agent, or Firm* — Nelson Mullins Riley & Scarborough LLP

(57) ABSTRACT

The invention relates to an electrically powered hand tool which comprises a device for providing tactile feedback to an operator of the tool. The tool further comprises a user-operated trigger for activating the working member of the tool. The tactile feedback provided by the tool alerts the operator about the activation status of the tool. More specifically, the operator is provided with an indication that the power to the tool is ON. The tactile feedback is provided at least from the time when the power to the tool is turned ON to the point in time when the trigger is pulled to activate the working member of the tool.

8 Claims, 3 Drawing Sheets

(56) References Cited

U.S. PATENT DOCUMENTS

| | | | |
|---|---|---|---|
| 2004/0216348 A1* | 11/2004 | McMoore | 42/70.07 |
| 2005/0136814 A1 | 6/2005 | Rudolf et al. | |
| 2005/0140516 A1* | 6/2005 | Kong et al. | 340/654 |
| 2006/0037766 A1* | 2/2006 | Gass et al. | 173/20 |
| 2006/0070459 A1* | 4/2006 | Kugler | 73/862.21 |
| 2006/0158440 A1* | 7/2006 | Ashenbrenner | G06F 3/016 345/179 |
| 2006/0225550 A1* | 10/2006 | Walters et al. | 83/70 |
| 2006/0238946 A1 | 10/2006 | Schreckenberger | |
| 2006/0281550 A1* | 12/2006 | Schena | A63F 13/06 463/37 |
| 2007/0097566 A1 | 5/2007 | Woods et al. | |
| 2010/0147119 A1* | 6/2010 | Cutler | B25B 23/1427 81/479 |
| 2010/0152586 A1* | 6/2010 | Grant | A61B 5/489 600/454 |
| 2010/0257990 A1* | 10/2010 | Schell | B27G 19/02 83/397 |
| 2011/0127941 A1* | 6/2011 | Hirabayashi | B25B 21/008 318/476 |
| 2012/0031635 A1* | 2/2012 | Svennung et al. | 173/20 |
| 2012/0045976 A1* | 2/2012 | Roser et al. | 451/358 |

FOREIGN PATENT DOCUMENTS

| | | |
|---|---|---|
| CN | 201248022 Y | 5/2009 |
| DE | 102007035096 A1 | 1/2009 |
| WO | 2008071521 A1 | 6/2008 |

OTHER PUBLICATIONS

Chapter I International Preliminary Report on Patentability of PCT/SE2009/051430 mailed on Jun. 19, 2012.
Extended Search Report of co-pending European application No. 09852354.1 mailed Jan. 3, 2014, all enclosed pages cited.
First Examination report of co-pending Chinese application No. 200980162931.9 mailed Apr. 30. 2014, all enclosed pages cited.

* cited by examiner

ELECTRIC HAND TOOL WITH ACTIVATION INDICATION DEVICE

TECHNICAL FIELD

The present invention relates to hand tools. More particularly, it relates to a safety device for ensuring safe operation of an electrically powered hand tool.

BACKGROUND

Hand tools are typically used to perform a variety of tasks such as cutting, trimming, mowing, blowing, drilling etc. Various hand tools that are commonly used for these tasks may include, but are not limited to, chainsaw, hedge trimmer, grass trimmer, blower, drill etc. The hand tools may be manual hand tools which utilizes human mechanical force or powered hand tools that may be petrol/diesel powered or electrically powered. A powered hand tool is usually provided with a user-operated trigger for activating a one or more working members of the tool. As for the electric hand tools, the electric power is provided to the hand tool by means of an electric cable connecting the tool to a power supply or by installing a battery in the tool.

Generally, in stand-by mode, i.e. when the power supply to the tool is ON but the user-operated trigger is not activated, petrol/diesel powered hand tools produce a sound and/or a vibration. This may provide an indication to the operator that the power supply to the tool is ON. However, electrically powered hand tools may be very silent. Due to the silent operation of the tool, they may not provide such indications to the operator about the ON/OFF status of the power supply. Thus, silent stand-by mode of electric tools may sometimes result in an accident as operators sometimes have a tendency to pull the user-operated trigger without expecting the hand tool to start. Consequently, there is a high risk of personal or property damage when a user approaches an electrically powered hand tool.

Therefore, there is a need for a safety device for an electrically powered hand tool to ensure safe operation of the tool. Moreover, there is a need for a device for providing an indication to the operator about the ON/OFF status of the power supply to the tool.

SUMMARY

In view of the above, it is an objective to solve or at least reduce the problems discussed above. In particular, an objective is to provide a safety device for electrically powered hand tools to reduce the risk of personal or property damage.

This is achieved with a device on the electrically powered hand tool according to claim 1, which provides a tactile feedback to an operator of the tool. The electrically powered hand tool is provided with a user-operated trigger for activating the working member/s of the tool. The tactile feedback provided by the device alerts the operator about the activation status of the tool. More specifically, the operator is provided with an indication that the power to the tool is ON. The tactile feedback is provided at least from the time when the power to the tool is turned ON to the point in time when the trigger is pulled to activate the working member of the tool. This helps in avoiding personal or property damage which may happen when an operator pulls the trigger without expecting the tool to start.

According to claim 2, the electrically powered hand tool comprises a user-operated means for switching the power ON/OFF to the tool. In an aspect of the invention, the user-operated means can be provided on the handle of the electrically powered hand tool so as to easily switch ON and OFF the power to the tool.

According to claim 3, the user-operated means on the electrically powered hand tool can be an actuable element such as, but not limited to, a button or a lever. The actuable element allows the operator to switch the power ON/OFF to the tool.

According to claim 4, the electrically powered hand tool can be automatically powered on installing a battery in the tool. In an aspect of the invention, the electrical power to the tool is automatically provided by the battery without the need of a user-operated means.

According to claim 5, the electrically powered hand tool can be automatically powered using a power supply. The tool is connected to the power supply using an electric cable for providing necessary power for operation of the tool. Moreover, there is no need of a user-operated means for switching the power ON/OFF to the tool.

According to claim 6, the operator of the electrically powered hand tool receives the tactile feedback in the form of a vibration. In an aspect of the invention, the electrically powered hand tool comprises a device to provide the tactile feedback to the operator in the form of vibrations. The vibrations provide an indication to the operator about the power ON/OFF status of the tool.

According to claim 7, the device which provides the vibrations can be a rotary vibration device or a non-rotary vibration device. Rotary vibration device includes an unbalanced electric motor for generating vibrations. Non-rotary vibration device may utilize a translating movement for generating the vibrations.

According to claim 8, the tactile feedback provided to the operator of the electrically powered hand tool may be a thermal feedback, an electrical feedback, or the like.

Further, according to claim 9, the tactile feedback may be provided in combination with other types of feedback such as, but not limited to, visual feedback and auditory feedback. The presence of other types of feedback along with the tactile feedback provides a better indication to the operator of the electrically powered hand tool about the power ON/OFF status of the tool.

According to claim 10, the electrically powered hand tool also comprises a handle. In an aspect of the invention, the tactile feedback can be provided to the operator in the handle of the tool. The handle is the most convenient position on an electrically powered hand tool for providing the feedback. Thus, the operator can be provided with a tactile feedback on gripping and holding the tool.

Another important consideration is to provide an electrically powered hand tool, which allows for safe and easy operation of the tool without creating any disturbance to the operator.

This is achieved with proper setting of the time for which the feedback is provided to the operator as described in claim 11. The tactile feedback is provided to the operator from the point in time when the power is turned ON to the point in time when the trigger is pulled to activate the working member of the tool and from a certain time after the trigger is released until it is pulled again. This is important for the cases when the operator is interrupted while working with the tool. Typically the operator lays the tool on the ground without switching OFF the power to the tool. Now, when the operator picks up the tool again or someone else picks up the tool, an indication is provided that the power to the tool is ON.

According to claim 12, the electrically powered hand tool may be provided with the tactile feedback for the time the tool is in a stand-by mode i.e. the power to the tool is ON but the trigger is not pulled.

According to claim 13, the electrically powered hand tool may be provided with the tactile feedback for the time the power to the tool is ON. However, this results in unnecessary consumption of power by the device which provides vibrations as the vibrations are also provided for the time the operator is working with the tool. Also, it becomes uncomfortable for the operator to work with the tool while simultaneously receiving the tactile feedback. But, this provides more safety to the operator compared to the other time settings.

According to claim 14, the electrically powered hand tool may be provided with a means for automatically switching the power ON/OFF to the tool. In an aspect of the invention, if the trigger is deactivated for a pre-defined time interval, the power to the tool may be automatically switched OFF. This helps in reducing the power consumption of the tool.

BRIEF DESCRIPTION OF THE DRAWINGS

The invention will in the following be described in more detail with reference to the enclosed drawings, wherein.

DESCRIPTION OF EMBODIMENTS

Figure 1:
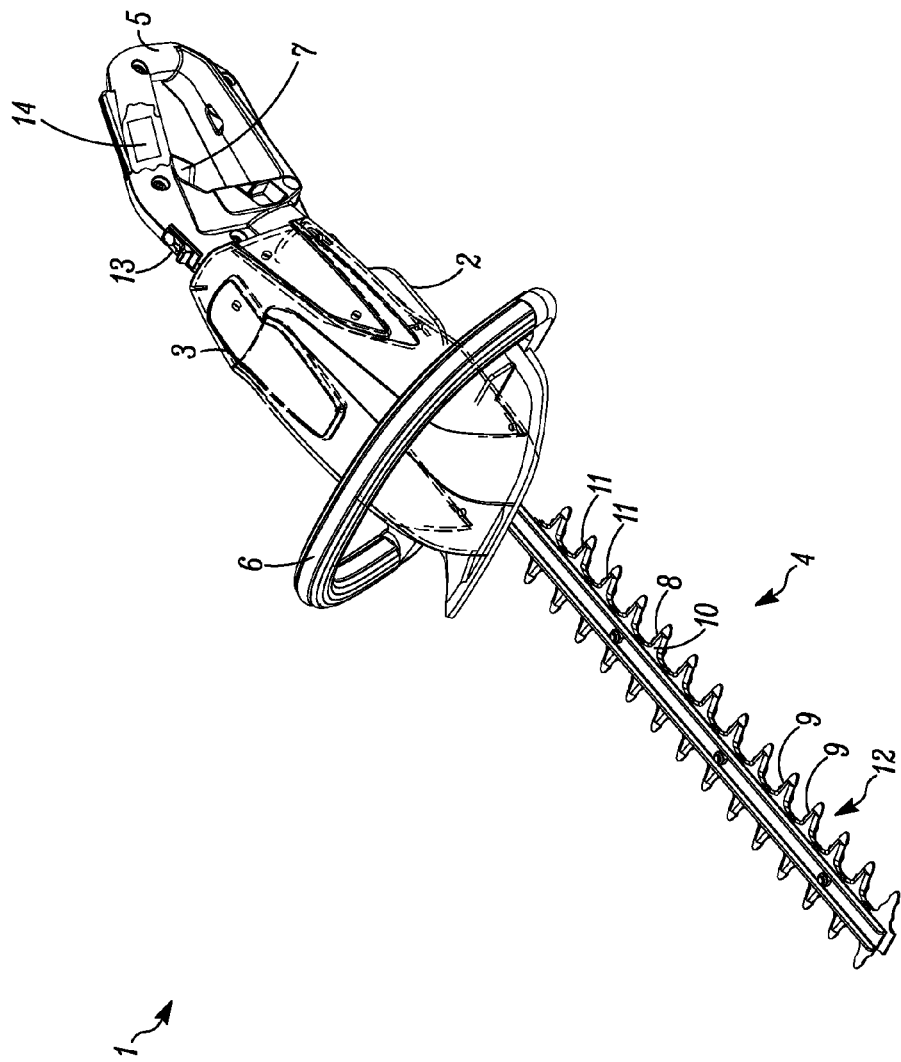
FIG. 1 shows a perspective view of a hedge trimmer, according to an embodiment of the present invention.

The present invention will be described more fully hereinafter with reference to the accompanying drawings, in which preferred embodiments of the invention are shown. This invention may, however, be embodied in many different forms herein; rather, these embodiments are provided so that this disclosure will be thorough and complete, and will fully convey the scope of the invention to those skilled in the art. In the drawings, like numbers refer to like references.

FIG. 1 shows a perspective view of an example handheld hedge trimmer 1, according to an embodiment of the present invention. Although the described example is a hedge trimmer, it should be understood that the present invention could be incorporated into any suitable type of power tool or power equipment and is not limited to use merely in a hedge trimmer, and may be incorporated in different types of embodiments. Various other power tools such as, but not limited to, chainsaw, grass trimmer, blower, and drill may be used. In addition, any suitable size, shape or type of elements or materials could be used.

The hedge trimmer 1 generally includes a frame 2, a drive unit 3 connected to the frame 2, and a cutter 4. As shown, the cutter 4 includes a pair of alternating, reciprocating cutting blades, though various other blade configurations including various numbers of cutting blades may also be used. In an embodiment of the present invention, the frame 2 may be made of metal, plastic, or the like. The frame may include a rear handle section 5 and/or a front handle section 6. The drive unit 3, in the exemplary embodiment shown, comprises an electric motor whose output shaft is connected to a drive shaft (not shown). The drive unit 3 is fixedly connected to the frame 2. A gearbox (not shown) is operatively connected to the drive unit 3, and is configured to transfer motor power to drive the cutter 4. The hedge trimmer 1 has a throttle device, attached to the frame 2, which has a user-operated trigger 7 at the rear handle section 5. The trigger 7 is provided to activate the cutter 4 of the trimmer 1. The trigger 7 is generally biased in a home position via a trigger spring (not shown). The trigger spring is typically a coiled spring located in the rear handle section 5, however, any suitable means to bias the trigger 7 at its home position may be provided.

In an exemplary embodiment of the present invention, the cutter 4 may include a plurality of cutting members 8, 10, one being located vertically above the other. Each cutting member 8, 10 may have a plurality of cutting teeth 9, 11, respectively. Each tooth 9, 11 may include a sharpened and/or serrated edge so as to provide a shearing-type cutting action as the first and second cutting members 8, 10 reciprocate relative to each other. Thus, items to be trimmed, such as plant foliage or the like (not shown), may be trimmed by the shearing-type cutting action when located within a gap 12 between adjacent teeth 9, 11.

The drive unit 3 may comprise an electric motor for providing power required for the operation of the tool. Various mechanisms may be used to power the electric motor provided in the drive unit 3. In one embodiment of the present invention, the electric motor may be powered automatically on installing a battery in the trimmer 1. In another embodiment of the present invention, the electric motor may be automatically powered on connecting the trimmer 1 to the power supply using an electric cable. In an embodiment of the present invention, the hedge trimmer 1 may be provided with a user-operated means 13 for switching ON/OFF the power to the drive unit 3. The user-operated means 13 may be a button or a lever. The user-operated means 13 may be located at any suitable position on the trimmer 1 such as, but not limited to, rear handle section 5. However, a person ordinarily skilled in the art may acknowledge that there is no limitation for the location of the user-operated means.

The trimmer 1 may have two modes of operation; a working mode in which the power to the trimmer 1 is ON and the user-operated trigger 7 is also pulled, and a stand-by mode in which the power to the trimmer 1 is ON but the user-operated trigger 7 is not pulled. In a further embodiment of the present invention, the trimmer 1 may be provided with a means for automatically switching off the power if the trigger 7 is not pulled for a pre-defined time interval.

In an embodiment of the present invention, a safety device 14 is provided on the rear handle section 5 of the trimmer 1. However, a person ordinarily skilled in the art may acknowledge that the safety device 14 may be located at any suitable position on the trimmer 1. The safety device 14 may provide a tactile feedback to an operator of the trimmer 1. The tactile feedback provides an indication to the operator about the ON/OFF status of the power to the trimmer 1. This may help in avoiding an accidental start of the cutting members 8, 10 which may result in personal or property damage. The tactile feedback is provided at least from the time when the power to the trimmer 1 is turned ON until the user-operated trigger 7 is pulled for the first time. In an embodiment of the present invention, the tactile feedback may be combined with other types of feedback, such as, but not limited to, visual feedback and auditory feedback.

In an embodiment of the present invention, the device 14 may provide the tactile feedback as long as the power to the trimmer 1 is ON. More specifically, the operator may get the tactile feedback for the period of time when the trimmer 1 is operating in the working mode and when it is operating in the stand-by mode. In another embodiment of the present invention, the tactile feedback may be provided to the operator only when the trimmer 1 is operating in the stand-by mode.

In yet another embodiment of the invention, the tactile feedback is provided by the device 14 from the time when the power to the trimmer 1 is turned ON until the trigger 7 is pulled for the first time and from a predefined time interval after the trigger 7 is released until it is pulled again. For example, the device 14 may provide the feedback from the time the power to the trimmer 1 is turned ON until the trigger 7 is pulled for the first time. Further, in case another operator picks up the trimmer 1, an indication is provided to this operator about the power ON status of the trimmer 1. Thus, a feedback is again provided from a time interval, e.g. 30 seconds, after the trigger 7 has been released until the trigger 7 is pulled again.

In an embodiment of the present invention, the tactile feedback may be a thermal feedback or an electrical feedback. In another embodiment, the tactile feedback may be provided by means of vibration. Further, the vibrations may be generated by using a rotary vibration device or a non-rotary vibration device.

In one embodiment, rotary vibration devices may include, but are not limited to, an unbalanced electric motor. This embodiment is explained in detail in conjunction with FIG. 2. In another embodiment of the present invention, a non-rotary vibration device that may generate vibrations by means of a translating movement is provided.

The non-rotary vibration device may include a moveable element such as a plunger surrounded by a coil. The plunger is attached at one end to a spring device. The spring device and the coil are fixed relative to a body (rear handle) onto which a vibration force is being exerted. The coil is an electromagnetic coil and may generate an electromagnetic field when current passes through it. If, for example, the plunger is ferromagnetic it will be attracted to a magnetic field. Thus when the coil is activated the plunger will be pulled into the coil, and when the coil is deactivated the spring device will pull the plunger back. In this fashion it is possible to create a vibration of the plunger by activating and deactivating the coil at a desired frequency. Vibration forces are transferred via the spring device and the coil onto the rear handle 5 of the trimmer 1.

In another embodiment of the present invention, translating movement may be generated by using an electrical motor equipped with a disc with axial cams, which interacts with a counter-disc mounted in the rear handle 5. This embodiment is explained in detail in conjunction with FIG. 3.

Figure 2:
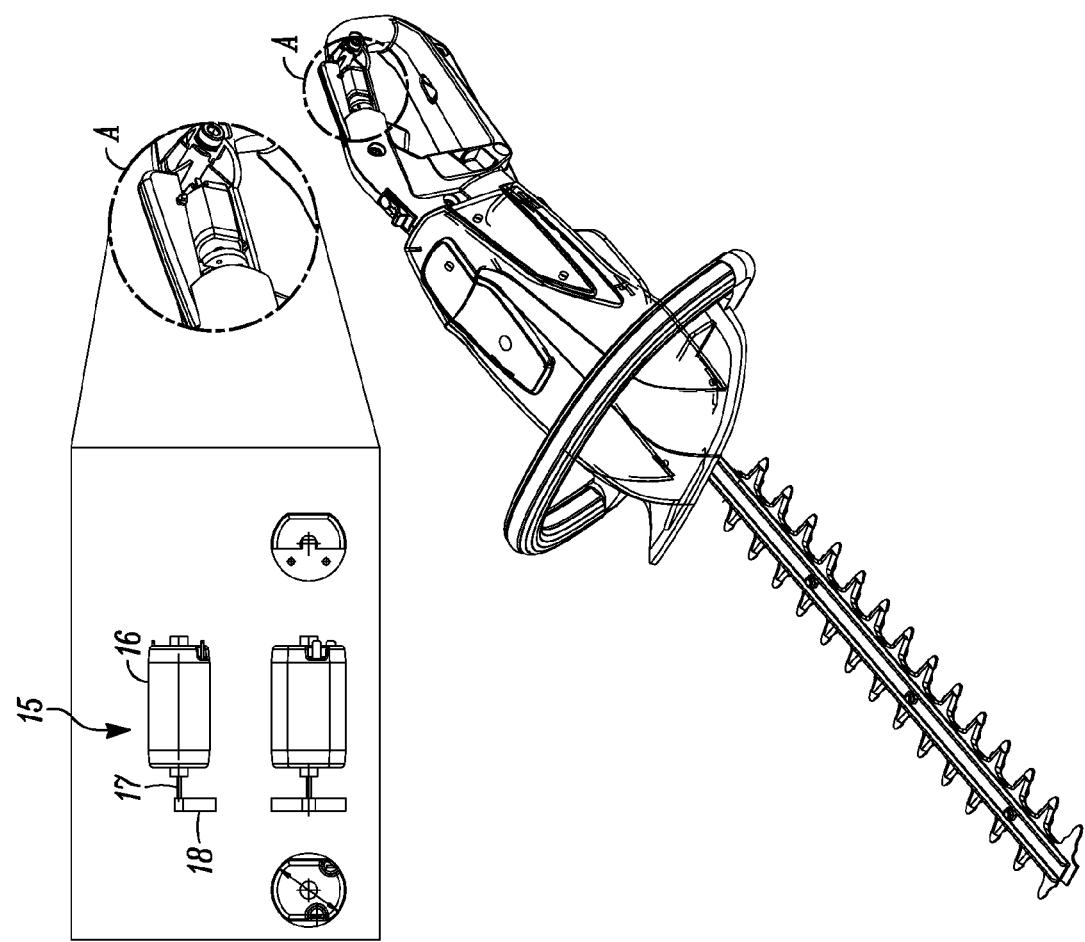
FIG. 2 shows a perspective view of a hedge trimmer and an exemplary vibration device, according to an embodiment of the present invention.

FIG. 2 shows a perspective view of a vibration device, according to an example embodiment of the present invention. The vibration device may include an unbalanced electric motor 15 having a motor body 16, a rotary shaft 17 and an unbalanced flywheel 18. The motor body 16 is generally cylindrical and accommodates the shaft 17, which extends along a center axis of the body 16. Electrical leads (not shown) extend from the body 16 opposite the shaft 17 so as to provide electrical power to the motor 15.

When the motor 15 is activated, the shaft 17 rotates the flywheel 18. In an embodiment, the flywheel 18 is a generally semi-circular disc centrally mounted to the shaft 17. When the shaft 17 rotates, the flywheel's eccentric imbalance causes the motor 15 as a whole to vibrate at a predetermined frequency according to the motor rotational speed. This vibration is transferred to the rear handle 5 of the trimmer 1 so that the operator receives the feedback. In other embodiments, the unbalanced motor 15 may be configured with rotational elements other than the semi-circular flywheel 18, such as a circular flywheel composed of two or more materials of differing weights or densities, or an otherwise unsymmetrical flywheel. In other embodiments, the unbalanced motor 15 is replaced with an alternative, electrically-activated vibrating component such as a piezoelectric element.

Figure 3:
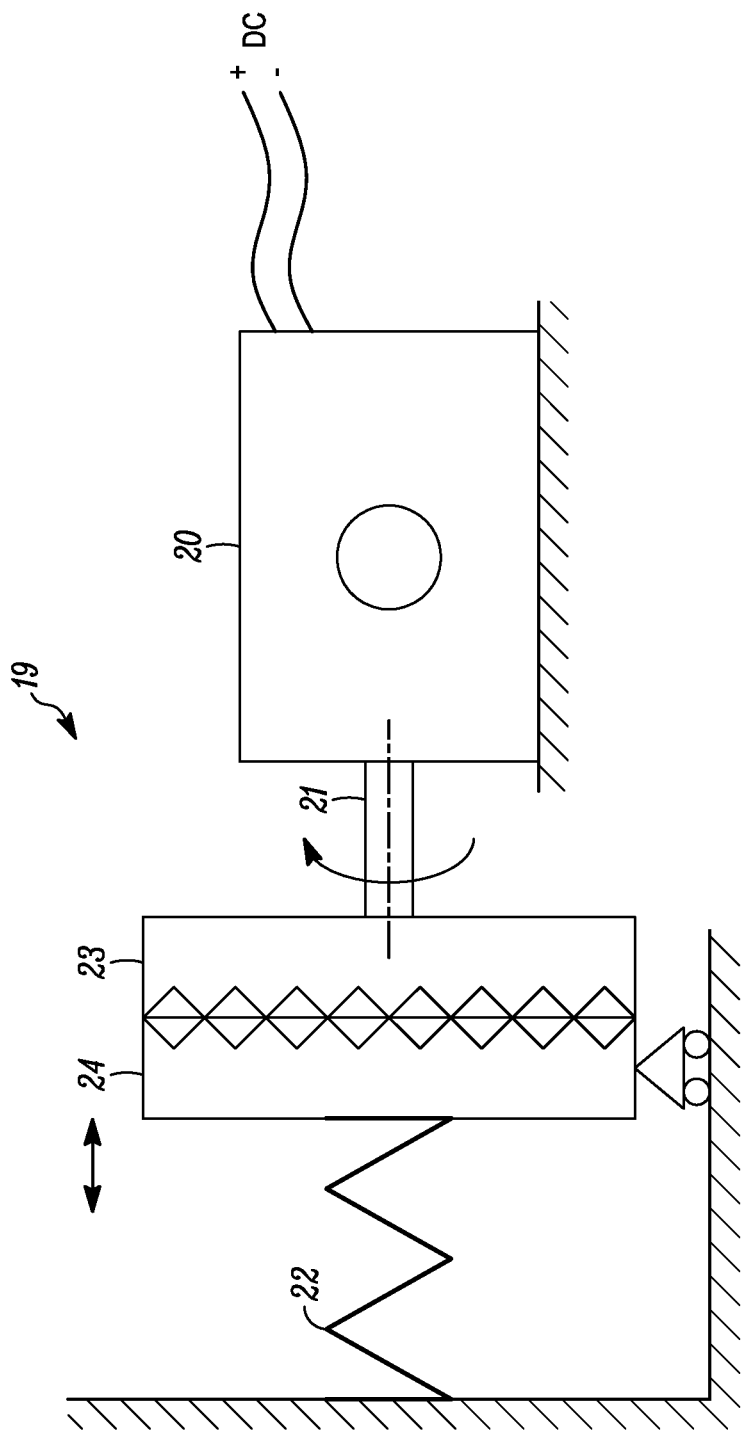
FIG. 3 shows a side view of an exemplary vibration device involving translating movement, according to another embodiment of the present invention.

In another embodiment of the present invention, vibrations are generated by a non-rotary vibration device involving translating movement. FIG. 3 shows a side view of a vibration device 19 involving translating movement, according to an example embodiment of the present invention. The vibration device 19 includes an electrical motor 20, a rotary shaft 21, a spring 22, a disc 23 and a counter-disc 24. Electrical leads extend from the part of the motor 20 opposite to the shaft 21 to provide electrical power to the motor 20. The disc 23 is mounted on the shaft 21 and the counter-disc 24 is mounted on the rear handle 5 of the trimmer 1. Both the discs are provided with axial cams and rotate about an axis perpendicular to the discs 23 and 24.

When the motor 20 is activated, the shaft 21 rotates the disc 23. The counter-disc 24, which is locked in the rotational direction, translates back and forth to produce a vibration. This vibration is transferred to the rear handle 5 so that the operator receives the feedback. Thus, rotation of the motor 20 results in translation motion of the counter-disc thereby producing a vibration in the rear handle 5 of the trimmer 1.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:
1. An electrically powered hand tool comprising:
one or more handles;
an actuator comprising a user-operated trigger for activating a working member of the tool;
a drive unit configured to drive the working member when power to the tool is ON and the actuator is activated, wherein the tool is ON:
  in response to a user operator means being switched to an ON position when a power supply is electrically connected to the tool,
  automatically upon installing a battery in the tool, or
  automatically upon connecting the tool to the power supply using an electric cable; and
a feedback device arranged to provide tactile feedback to an operator,
wherein the tactile feedback is provided during a stand-by mode of the tool in which the power to the tool is ON and the actuator is not activated, and no tactile feedback is provided in a working mode of the tool in which the power to the tool is ON and the actuator is activated,
wherein no power is provided to the drive unit of the tool in the stand-by mode and power is provided to the drive unit activating the working member of the tool in the working mode, and
wherein the tactile feedback comprises at least a vibration generated by a rotary vibration device disposed within the one or more handles of the electrically powered hand tool, and wherein the vibration device comprises an unbalanced motor.

2. The electrically powered hand tool according to claim 1, wherein the user-operated means includes at least one of a button or a lever.

3. The electrically powered hand tool according to claim 1, wherein the tactile feedback further comprises thermal feedback.

4. The electrically powered hand tool according to claim 1, wherein the tactile feedback is provided in combination with at least one of visual feedback and auditory feedback.

5. The electrically powered hand tool according to claim 1, wherein the tool is provided with a means for automatically switching off the power if the actuator is deactivated for a pre-defined time interval.

6. The electrically powered hand tool according to claim 1, wherein the tactile feedback is provided via electrical feedback.

7. The electrically powered hand tool according to claim 1, wherein the unbalanced motor comprises a motor body, a rotary shaft, and an unbalanced flywheel, wherein the shaft rotates the flywheel causing the vibration.

8. The electrically powered hand tool according to claim 7, wherein the flywheel comprises a semi-circular disc centrally mounted to the rotary shaft.

* * * * *